US011018928B2

(12) United States Patent
Gan et al.

(10) Patent No.: US 11,018,928 B2
(45) Date of Patent: May 25, 2021

(54) ADAPTIVE ACCESS POINT CONFIGURATION

(71) Applicant: International Business Machines Corporation, Armonk, NY (US)

(72) Inventors: Seng Chai Gan, Ashburn, VA (US); Gregg Talewsky, Branchburg, NJ (US)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 16/281,566

(22) Filed: Feb. 21, 2019

(65) Prior Publication Data
US 2020/0274756 A1 Aug. 27, 2020

(51) Int. Cl.
*H04L 12/24* (2006.01)
*H04W 88/08* (2009.01)
*H04W 84/12* (2009.01)

(52) U.S. Cl.
CPC ......... *H04L 41/0803* (2013.01); *H04W 88/08* (2013.01); *H04W 84/12* (2013.01)

(58) Field of Classification Search
CPC ....... H04L 41/04; H04L 41/085; H04L 41/12; H04L 45/02; H04W 84/18
USPC ........................................................ 370/254
See application file for complete search history.

(56) References Cited

U.S. PATENT DOCUMENTS

| | | | | |
|---|---|---|---|---|
| 8,547,829 | B1 * | 10/2013 | Shah ..................... | H04W 76/12 370/217 |
| 8,964,595 | B2 | 2/2015 | Agarwal | |
| 10,057,922 | B2 | 8/2018 | Soldati | |
| 2007/0032254 | A1* | 2/2007 | Chen ..................... | H04W 16/14 455/509 |
| 2012/0046057 | A1* | 2/2012 | Pesola .................. | H04W 72/048 455/509 |
| 2013/0176925 | A1 | 7/2013 | Sampath | |
| 2014/0274089 | A1* | 9/2014 | Hassan ................. | H04W 24/02 455/452.1 |
| 2015/0230231 | A1* | 8/2015 | Fornoles, Jr. ......... | H04W 48/20 455/509 |
| 2016/0262163 | A1* | 9/2016 | Gonzalez Garrido ..................... | H04W 16/10 |
| 2016/0295638 | A1* | 10/2016 | Allanki ................. | H04W 48/20 |
| 2017/0048728 | A1* | 2/2017 | Ngo ....................... | H04W 76/15 |
| 2017/0215185 | A1* | 7/2017 | Fukuta ................. | H04W 74/002 |

(Continued)

FOREIGN PATENT DOCUMENTS

WO         28809311 A1    2/2014

*Primary Examiner* — Robert J Lopata
(74) *Attorney, Agent, or Firm* — Aaron N. Pontikos (57) ABSTRACT

A computer-implemented method for optimizing a quality of service of a network includes: determining (i) a set of configuration settings of a plurality of devices and (ii) a set of capabilities of the plurality of devices located within a coverage area of a wireless network; determining a set of capabilities of a plurality of wireless access points of the wireless network; determining an underutilized network capability of the wireless network based, at least in part, on the set of configuration settings of the plurality of devices, the set of capabilities of the plurality of devices, and the set of capabilities of the plurality of wireless access points; and configuring one or more wireless access points of the plurality of wireless access points based, at least in part, on the underutilized network capability. A corresponding computer program product and computer system are also disclosed.

17 Claims, 3 Drawing Sheets

(56) References Cited

U.S. PATENT DOCUMENTS

| | | | |
|---|---|---|---|
| 2017/0289837 A1* | 10/2017 | Duo | H04W 28/0268 |
| 2017/0289900 A1 | 10/2017 | Tchigevsky | |
| 2018/0249401 A1* | 8/2018 | Zhou | H04W 74/0825 |
| 2018/0343672 A1* | 11/2018 | Hassan | H04B 1/38 |
| 2019/0058999 A1* | 2/2019 | Gunasekara | H04W 16/10 |
| 2020/0045761 A1* | 2/2020 | Zeng | H04W 72/1215 |
| 2020/0107243 A1* | 4/2020 | Chen | H04W 40/12 |

* cited by examiner

ADAPTIVE ACCESS POINT CONFIGURATION

BACKGROUND

The present invention relates generally to the field of wireless networks, and more particularly to performance optimization of wireless networks.

Generally, a wireless network refers to any network not connected by cables. The increase in the different use cases and applications of wireless networks, coupled with the increased demand for convenience and mobility of a user has led to the development of over a dozen wireless communication technologies spread across three main types of wireless networks: (i) wireless personal area network (WPAN), (ii) wireless local area network (WLAN), and (iii) wireless wide area network (WWAN). Each of these three types of wireless networks are utilized based on the geographic range for which information is to be transmitted.

A WPAN is a computer network for interconnecting devices within the environment of an individual user using low-powered, short-distance wireless network technologies such as Bluetooth, Near Field Communication (NFC), and wireless USB. A WLAN is computer network that links two or more devices within a limited area that is greater than a WPAN using wireless fidelity (Wi-Fi) technology. A WWAN is a telecommunications network that provides wireless access to a device using mobile telecommunication cellular network technologies—such as LTE and WiMAX—which are capable of transferring data from anywhere within the regional boundaries of a cellular service provider.

SUMMARY

According to one embodiment of the present invention, a computer-implemented method for optimizing a quality of service of a network is disclosed. The computer-implemented method includes determining, by one or more processors, (i) a set of configuration settings of a plurality of devices and (ii) a set of capabilities of the plurality of devices located within a coverage area of a wireless network. The computer-implemented method further includes determining, by the one or more processors, a set of capabilities of a plurality of wireless access points of the wireless network. The computer-implemented method further includes determining, by the one or more processors, an underutilized network capability of the wireless network based, at least in part, on the set of configuration settings of the plurality of devices, the set of capabilities of the plurality of devices, and the set of capabilities of the plurality of wireless access points. The computer-implemented method further includes configuring, by the one or more processors, one or more wireless access points of the plurality of wireless access points based, at least in part, on the underutilized network capability.

According to another embodiment of the present invention, a computer program product for optimizing a quality of service of a network is disclosed. The computer program product includes one or more computer readable storage media and program instructions stored on the one or more computer readable storage media. The program instructions include instructions to determine: (i) a set of configuration settings of a plurality of devices and (ii) a set of capabilities of the plurality of devices located within a coverage area of a wireless network. The program instructions further include instructions to determine a set of capabilities of a plurality of wireless access points of the wireless network. The program instructions further include instructions to determine an underutilized network capability of the wireless network based, at least in part, on the set of configuration settings of the plurality of devices, the set of capabilities of the plurality of devices, and the set of capabilities of the plurality of wireless access points. The program instructions further include instructions to configure one or more wireless access points of the plurality of wireless access points based, at least in part, on the underutilized network capability.

According to another embodiment of the present invention, a computer system for optimizing a quality of service of a network is disclosed. The computer system includes one or more computer system includes one or more computer processors, one or more computer readable storage media, and program instructions stored on the computer readable storage media for execution by at least one of the one or more processors. The program instructions include instructions to determine: (i) a set of configuration settings of a plurality of devices and (ii) a set of capabilities of the plurality of devices located within a coverage area of a wireless network. The program instructions further include instructions to determine a set of capabilities of a plurality of wireless access points of the wireless network. The program instructions further include instructions to determine an underutilized network capability of the wireless network based, at least in part, on the set of configuration settings of the plurality of devices, the set of capabilities of the plurality of devices, and the set of capabilities of the plurality of wireless access points. The program instructions further include instructions to configure one or more wireless access points of the plurality of wireless access points based, at least in part, on the underutilized network capability.

DETAILED DESCRIPTION

A wireless local area network (WLAN) is a communications technology that allows two or more devices to exchange data between each other through the use of high-frequency radio waves. In a WLAN, a wireless access point enables a wireless device to obtain a local area network (LAN) connection (typically to the Internet). A wireless access point may generally be understood as a base station for a wireless network that transmits and receives radio frequencies (typically Wi-Fi) to and from a wireless client device. Through a wireless access point, a wireless client device can maintain network connectivity so long as the wireless client device remains within a coverage area provided by a wireless access point of the WLAN.

The increased use of Wi-Fi—and thus wireless access points—has led to the rapid development of new wireless technologies and Wi-Fi standards. Historically, wireless access points have been built to support 2.4 GHz wireless networks. Although 5 GHz wireless networks have been around for just as long as 2.4 GHz wireless networks, the initial implementation of 5 GHz wireless networks was hindered by increased equipment deployment costs. Accordingly, 2.4 GHz wireless networks, and thus 2.4 GHz capable wireless devices, became the well-established standard in wireless communication technologies.

More recently, the increased demand for greater bandwidth due to streaming, large file transfers, gaming, and high-definition audio and video has led to a shift from 2.4 GHz wireless networks to 5 GHz wireless networks. Similarly, the shift from 2.4 GHz to 5 GHz wireless networks has also led to the development of new network protocols and hardware to increase network throughput. Thus, as the number of users and applications that require greater network bandwidth continues to grow, network performance requirements must increase along with them.

However, embodiments of the present invention recognize that since a large number of 2.4 GHz capable devices currently remain in use, WLANs are often forced to operate below their optimal or peak capabilities. For example, embodiments of the present invention recognize that wireless access points are often configured to operate at a lower frequency band (e.g., 2.4 GHz vs. 5 GHz) and thus at slower speeds and slower data transfer rates to support interoperability between older legacy devices and current state of the art devices. In another example, embodiments of the present invention recognize that wireless access points are often configured to operate via an older, slower network protocol (e.g., 802.11a vs. 802.11ac) to support interoperability between older legacy devices and current state of the art devices. Thus, although a wireless access point or logical group of wireless access points of a WLAN are capable of being configured to support a higher frequency band or a faster network protocol, the wireless access points of a WLAN are often configured to operate at sub-optimal performance levels to support these older legacy devices.

Embodiments of the present invention further recognize that configuring wireless access points to operate at sub-optimal performance levels to support older legacy devices is compounded by the fact that the wireless configuration settings of a device are often set below the optimal or peak wireless capabilities of the device. For example, although a wireless device is configured to connect to a 2.4 GHz wireless network, the wireless device may also be capable of connecting to a 5 GHz wireless network based on a change in the configuration settings of the device. In another example, although a wireless device is configured to communicate with a wireless access point via an 802.11n network protocol, the wireless device may also be capable of communicating via a network protocol with a higher data transfer rate (e.g., via an 801.11ac network protocol) based on a change in the configuration settings of the device. Consequently, although a wireless access point or logical group of wireless access points are capable of supporting higher band frequencies or faster network protocols, the wireless access points of a WLAN are often configured to operate at lower frequency bands or slower network protocols in order to accommodate what appear to be "legacy" devices, but in actuality, are just devices with "legacy" wireless configuration settings.

Embodiments of the present invention further recognize that current approaches for measuring the quality of service of a network are based on the configuration settings of a wireless client device alone since a device's configuration settings can be readily gathered from information provided in a probe request. However, the configuration settings of a wireless client device, in of itself, are not necessarily a good indicator as to whether an underutilized capability of a wireless network truly exists. This stems from the fact that when a probe request is sent from a wireless client device to a wireless access point to access a wireless network, only the wireless client device's configured settings are transmitted via the probe request. Thus, the entire set of capabilities of the device are not discoverable from the information included in the probe request.

Embodiments of the present invention provide for optimizing a quality of service (QoS) of a wireless network for those devices located within a coverage area of the wireless network. In embodiments of the invention, system configuration settings of a wireless access point and/or logical group of wireless access points are automatically configured based, at least in part, on determining underutilized network capabilities of the wireless network.

Embodiments of the invention further provide for optimizing the quality of service of a wireless network based on analyzing a set of device configuration settings and a set of device capabilities to determine whether a device having configuration settings below an underutilized network capability will be adversely impacted by a change in the configuration settings of an access point to support the underutilized network capability. Accordingly, embodiments of the invention provide for a more comprehensive analysis of the devices located within a coverage area of a wireless network to determine: (i) the particular access points, (ii) the number of access points and (iii) the configurations of access points for supporting the underutilized network capability in order to optimize the overall quality of service of a network while mitigating any adverse impacts of said optimization.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
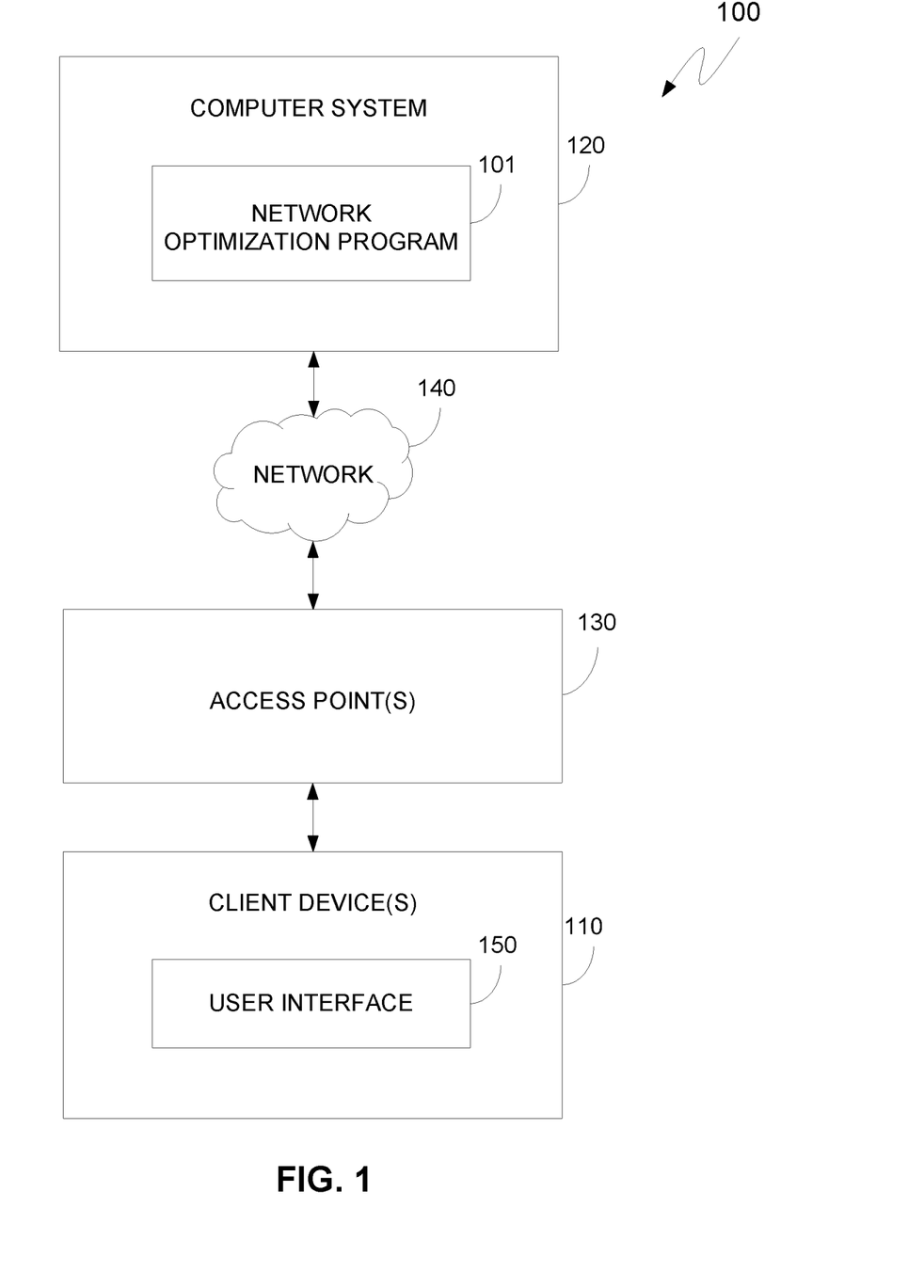
FIG. 1 is a functional block diagram illustrating a network computing environment, generally designated 100, suitable for operation of a network optimization program in accordance with at least one embodiment of the invention.

The present invention will now be described in detail with reference to the Figures. FIG. 1 is a functional block diagram illustrating a network computing environment, generally designated 100, suitable for operation of a network optimization program 101 in accordance with at least one embodiment of the invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Network computing environment 100 includes client device(s) 110, computer system 120 and access point(s) 130 interconnected over network 140. In various embodiments, network 140 can be, for example, a telecommunications network, a local area network (LAN), a wide area network (WAN), such as the Internet, or a combination of the three, and can include wired, wireless, or fiber optic connections. Network 140 can include one or more wired and/or wireless networks that are capable of receiving and transmitting data, voice, and/or video signals, including multimedia signals that include voice, data, and video information. In some embodiments, network 140 is any combination of connections and protocols that will support a WLAN between client device(s) 110 and access point(s) 130. For example, network 140 exists within an IP network that supports wireless communications between client device(s) 110 and access point(s) 130 of a WLAN. In general, network 140 can be any combination of connections and protocols that will support communications between client device(s) 110, computer system 120, access point(s) 130, and other computing devices (not shown) within network computing environment 100.

In various embodiments of the invention, client device(s) 110 is a computing device that can be a laptop computer, tablet computer, netbook computer, personal computer (PC), a desktop computer, a personal digital assistant (PDA), a smartphone, smartwatch, or any programmable electronic device capable of receiving, sending, and processing data. Client device(s) 110 allows a user(s) to wirelessly send and/or receive data via access point(s) 130. In general, client device(s) 110 represents any programmable electronic devices or combination of programmable electronic devices capable of executing machine readable program instructions and communicating with computer system 120, access point(s) 130 and other computing devices (not shown) within network computing environment 100 via a network, such as network 140.

Client device(s) 110 includes user interface 150. User interface 150 provides an interface between a client device 110, computer system 120, and access point(s) 130. In some embodiments, user interface 150 can be a graphical user interface (GUI) or a web user interface (WUI) and can display text, documents, web browser windows, user options, application interfaces, and instructions for operation, and includes the information (such as graphic, text, and sound) that a program presents to a user and the control sequences the user employs to control the program. In other embodiments, user interface 150 can be mobile application software that provides an interface between client device 110 and network optimization program 101.

In various embodiments of the invention, computer system 120 is a computing device that can be a standalone device, a management server, a web server, a media server, a mobile computing device, or any other programmable electronic device or computing system capable of receiving, sending, and processing data. In other embodiments, computer system 120 represents a server computing system utilizing multiple computers as a server system, such as in a cloud computing environment. In an embodiment, computer system 120 represents a computing system utilizing clustered computers and components (e.g. database server computers, application server computers, web servers, and media servers) that act as a single pool of seamless resources when accessed within network computing environment 100. In general, computer system 120 represents any programmable electronic device or combination of programmable electronic devices capable of executing machine readable program instructions and communicating with client device(s) 110 and access point(s) 130 within network computing environment 100 via a network, such as network 140.

Computer system 120 includes network optimization program 101. Although network optimization program 101 is depicted in FIG. 1 as being integrated with computer system 120, in alternative embodiments, network optimization program 101 is remotely located from computer system 120. For example, network optimization program 101 can be integrated with access point(s) 130. Computer system 120 may include internal and external hardware components, as depicted and described in further detail with respect to FIG. 3.

In various embodiments of the invention, access point(s) 130 is a computing device that can be a standalone device, a mobile computing device, or any other programmable electronic device or computing system capable of connecting a wireless device, such as client device(s) 110 to a wired LAN network, such as network 140. In general, access point(s) 130 is connected to a wired LAN (e.g., via Ethernet) and provides wireless connections to the LAN via a WLAN technology (e.g., Wi-Fi). In some embodiments, access point(s) 130 is a standalone networking hardware device connected to a router via wired, fiber optic and/or wireless connections. In other embodiments, access point(s) 130 is part of a combination of network hardware devices, including, but not limited to a modem, network switch, and router.

In various embodiments of the invention, access point(s) 130 is configurable as a single point-to-point access point and/or a point-to-multipoint bridge. In a single point-to-point configuration, a single access point 130 accepts connections from clients and other devices in the network, such as network 140. In a point-to-multipoint bridge configuration (i.e., wireless distribution system ("WDS")), each access point 130 acts as a wireless link or bridge between two or more access points. The notable advantage of a WDS over a strictly single point-to-point configuration is the preservation of a client's media access control ("MAC") address across links between access points. This allows for uninterrupted wireless network connectivity as a wireless device transitions between a coverage area of one access point to a coverage area of another access point. In some embodiments, in a point-to-multipoint bridge configuration, access point 130 serves as a wireless bridge, in which access point 130 only communicates with other access points. In other embodiments, in a point-to-multipoint bridge configuration, access point 130 serves as a wireless repeater, in which access point 130 communicates with other access points and wireless client devices.

In various embodiments of the invention, access point(s) 130 can be a single-band access point, a dual-band access point, a tri-band access point, a selectable band access point and any combination thereof. A single-band access point only supports a single band and transmits wireless signals at a single frequency band (e.g., either 2.4 GHz or 5 GHz).

A dual band access point can support two bands. In some embodiments, a dual-band access point is configured to simultaneously support two different bands by transmitting wireless signals at a first frequency band (e.g., 2.4 GHz) and at a second band frequency (e.g., 5 GHz). In other embodiments, a dual-band access point is configured to support two bands of the same frequency. For example, a dual-band access point is configured to support two 2.4 GHz frequency bands or two 5 GHz frequency bands.

A tri-band access point can support three bands. In some embodiments, a tri-band access point can be configured to simultaneously support three bands each having a different frequency. In some embodiments, a tri-band access point is configured to simultaneously support a first band at a first frequency and a second and third band at a second frequency. In other embodiments, a tri-band access point is configured to support three bands each having the same frequency.

However, one of ordinary skill in the art will appreciate that the invention can be practiced with access point(s) 130 being configurable with any number of bands (single-band, dual-band, tri-band or otherwise), any known or future known frequency bands and any combination thereof for wirelessly transmitting data between a wireless device and an access point and/or between two access points.

In various embodiments of the invention, access point(s) 130 are compatible with any generally known or future known IEEE802.11 standard wireless protocols for implementing WLAN Wi-Fi communication via wireless frequencies including, but not limited to 2.4 GHz, 5 GHz, and 60 GHz. For example, on a 2.4 GHz wireless network, access point(s) 130 can operate via IEEE802.11b, IEEE802.11g and IEEE802.11n protocols. In another example, on a 5 GHz wireless network, access point(s) 130 can operate via IEEE802.11a, IEEE802.11n and IEEE802.11ac protocols.

Figure 2:
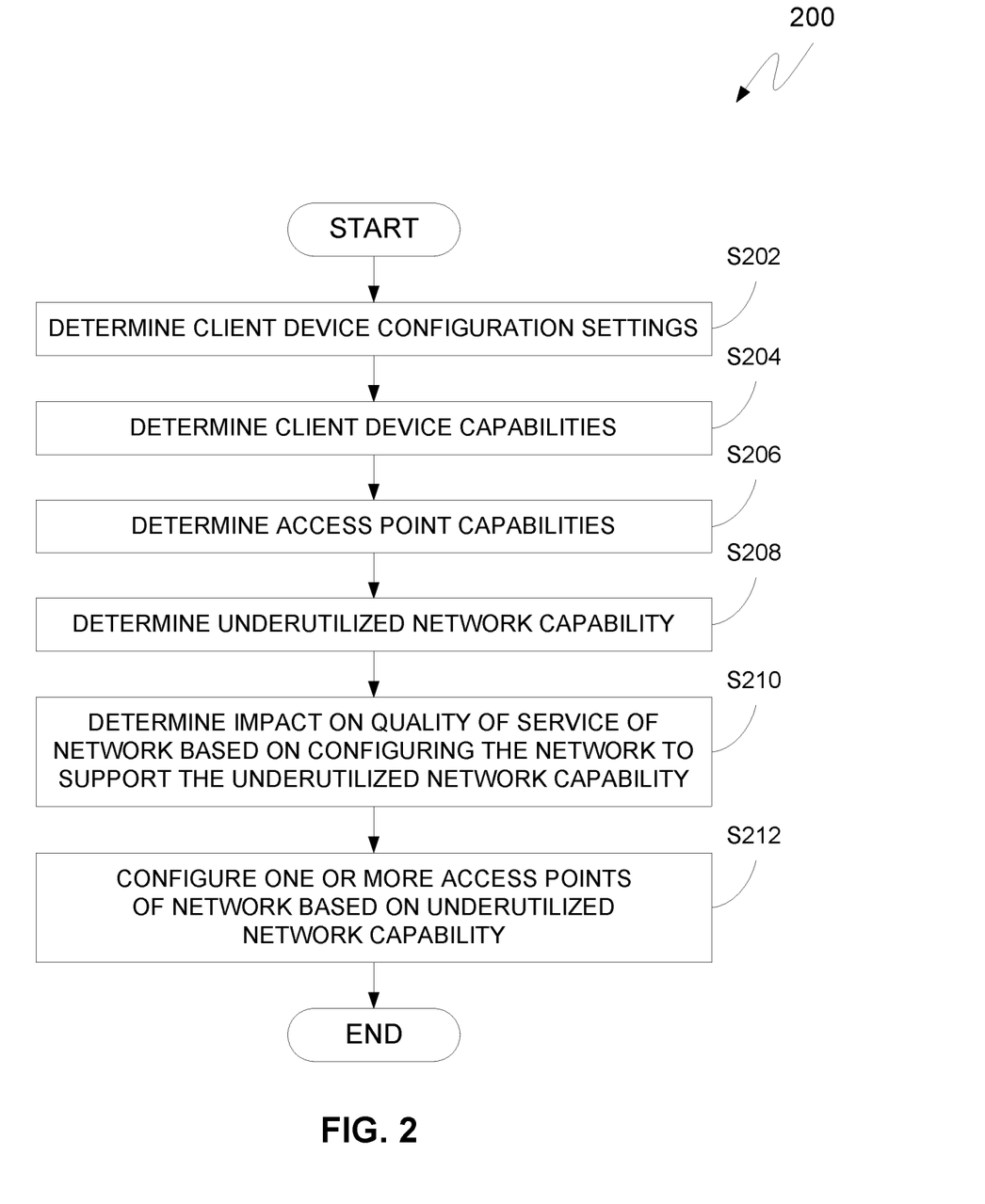
FIG. 2 is a flow chart diagram depicting operational steps, generally designated 200, for a network optimization program executing on a computer system, in accordance with at least one embodiment of the invention.

FIG. 2 is a flowchart diagram depicting operational steps, generally designated 200, for a network optimization program 101 executing on computer system 120, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, network optimization program 101 determines a set of configuration settings of client device(s) 110 located within a coverage area of a WLAN, such as network 140. In some embodiments, network optimization program 101 determines device configuration settings of a client device. In some embodiments, network optimization program 101 determines wireless configuration settings of a client device. In embodiments of the invention, information pertaining to wireless configuration settings may include, but is not limited to supported data transmission rates, supported band frequencies, supported IEEE802.11 standard wireless protocols and supported channel widths.

One of ordinary skill in the art will appreciate that the wireless configuration settings of a device are distinct from the wireless capabilities of the device. In embodiments of the invention, the wireless configuration settings of a device may generally be thought of as a subset of the wireless capabilities of a device. For example, although a wireless device is configured to operate at a data transfer rate of 36 megabits per second (Mbps), the device may also be capable of operating at a data transfer rate of 56 Mbps based on a change in the wireless configuration settings. Thus, the configured settings of a device is dependent on the specific wireless configuration settings of a device that have been set automatically or manually defined by a given program or user.

In embodiments of the invention, network optimization program 101 determines wireless configuration settings of client device(s) 110 based on information included in a probe request transmitted from a wireless client device 110 to a wireless access point 130. A probe request may generally be understood as a low-level scan by a wireless device to discover availability of an 802.11 WLAN within its proximity. Typically, a probe request frame includes two main sections—the Media Access Control (MAC) header and the frame body. The MAC header, among other various information, includes the MAC address (a unique identifier assigned to a network interface controller (NIC) of a wireless device). The frame body, among other various information, includes wireless configuration setting information (e.g., IEEE 802.11 network protocols and minimum supported data rates) of the wireless device.

One of ordinary skill in the art will appreciate that the information included in a probe request frame is the wireless configuration settings of a device. Thus, depending on the wireless configuration settings of a device, the full set of wireless capabilities of the device may not be discoverable from the information included in the probe request frame. For example, a probe request frame transmitted from a wireless device that has a network interface card (NIC) capable of supporting wireless communications via a 5 GHz wireless network but configured to support wireless communications via a 2.4 GHz wireless network will only include information pertaining to support of the 2.4 GHz wireless network. In another example, a probe request frame transmitted from a wireless device that has a NIC capable of supporting wireless communications via the 802.11 ac network protocol but configured to support wireless communications via the 802.11a network protocol will only include information pertaining to support of the 802.11a configuration setting.

At step S204, network optimization program 101 determines a set of capabilities of client device(s) 110 located within a coverage area of a WLAN. In some embodiments, network optimization program 101 determines device capabilities of a client device. In some embodiments, network optimization program 101 determines wireless capabilities of a client device. In embodiments of the invention, information pertaining to wireless capabilities can include, but is not limited to data transmission rates, extended data transmission rates, band frequencies, IEEE802.11 standard wireless protocols and channel widths.

One of ordinary skill in the art will appreciate that the capabilities of a device may be distinguishable from the configuration settings of a device in that a device can be configured to operate below a particular capability of the device. Similarly, a configuration setting of a device can be disabled thereby rendering a particular capability of the device inoperable. Accordingly, the capabilities of a device include all of the possible settings that a device can be configured to, regardless of whether the device is actually configured to a particular setting.

In some embodiments, network optimization program 101 determines wireless capabilities of client device(s) 110 based, at least in part, on determining the manufacturer of a device. In these embodiments, network optimization program 101 determines the manufacturer based on the MAC address included in a probe request frame sent from client device(s) 110. A MAC address of a device is a unique identifier (generally a 48-bit address expressed as 12 hexadecimal digits) assigned to a network interface controller ("NIC") for communications at the data link layer of a network. MAC addresses are assigned by the manufacturer of a NIC and are stored in its hardware, such as the card's read-only memory. The first 24 bits or 6 hexadecimal digits contain a manufacturer identification (vendor code), also known as the Organizational Unique Identifier ("OUI"). The last 24 bits or 6 hexadecimal digits are administered by the vendor. Accordingly, based on the MAC address of a wireless device, network optimization program 101 compares the first 6 hexadecimal digits of the MAC address to a database of registered manufacturer OUI's, (e.g., the IEEE OUI registration database) to determine the manufacturer of the NIC.

In some embodiments, network optimization program 101 determines wireless capabilities of client device(s) 110 based, at least in part, on determining the device model (i.e., device type) of a wireless device. One of ordinary skill in the art will appreciate that based on the known model of a device, the manufacturer and model of the NIC associated with the model, and thus the wireless capabilities of a particular manufacturer and model of NIC can be determined.

In an embodiment, network optimization program 101 determines the device model of client device(s) 110 based on comparing the MAC address of a wireless device to a database of registered MAC addresses. For example, an employer registers the MAC address for each company owned device. Based on a MAC address included in a probe request frame transmitted from a company owned device, the device type corresponding to the MAC address can be determined.

In an embodiment, network optimization program 101 determines the device model of client device(s) 110 based on learning a range of MAC addresses that correspond to a manufacturer and model of a wireless device. Embodiments of the present invention recognize that when a particular device model is manufactured by a vendor, a multitude of devices are manufactured or issued over a brief period of time. Accordingly, devices that are of the same manufacturer and model oftentimes have MAC addresses that fall within a particular, discernable range. Based on determining the manufacturer (from the OUI of the first 24 bits of the MAC address) and learning various ranges of the second 24 bits of MAC addresses that correspond to particular models of a given manufacturer, the device model can be determined.

In some embodiments, network optimization program 101 determines wireless capabilities of client device(s) 110 based, at least in part, on accessing the network configuration properties of a NIC or network adapter of a wireless device. For example, when connecting to a WLAN, network optimization program 101 prompts the user to either accept or reject access to the devices network configuration properties. Based on accessing a device's network configuration properties, network optimization program 101 can determine wireless capability information including, but not limited to supported band frequencies, supported minimum data rates, supported WLAN channels, supported WLAN channel widths, and supported IEEE 802.11 standard network protocols. In other embodiments, network optimization program 101 determines wireless capabilities of client device(s) 110 based, at least in part, on prompting a user to input a device's manufacturer, model, and/or network configuration properties.

At step S206, network optimization program 101 determines a set of capabilities of access point(s) 130 of a network. In embodiments of the invention, information pertaining to wireless capabilities of an access point can include, but is not limited to the number of bands, band frequencies, data transmission rates, IEEE802.11 standard network protocols, channel widths, and radio transmit power. In some embodiments, network optimization program 101 determines wireless capability information for an access point of a WLAN based on retrieving wireless capability information from a database. For example, network optimization program retrieves software documentation for a particular model of an access point of a WLAN. In other embodiments, network optimization program 101 determines wireless capability information for an access point of a WLAN based on accessing the network configuration properties of an access point.

At step S208, network optimization program 101 determines an underutilized network capability of the network. In embodiments of the invention, an underutilized network capability may generally be understood as a capability of a wireless network, that if utilized, would generally increase the performance of the network. Examples of an increase in the performance of a network resulting from configuring the network to support the underutilized capability may include, but are not limited to: (i) increase in network speed, (ii) increase in network bandwidth, (iii) increase in network throughput, (iv) increase in network coverage area, (v) increase in radio transmit power, (vi) increase in channel width, (vii) increase in data transfer rate and (viii) decrease in signal interference.

In embodiments of the invention, network optimization program 101 determines an underutilized network capability based on comparing the configuration settings of access point(s) 130 to the capabilities of access point(s) 130. In some embodiments, an underutilized network capability is an unconfigured setting of an access point. For example, access point 130 is configured to support a 2.4 GHz wireless network, but is capable of supporting a 5 GHz wireless network. Thus, in this example, the underutilized network capability of access point 130 is support of a 5 GHz wireless network. In some embodiments, an underutilized network capability is an underutilization of a configuration setting of an access point. For example, access point 130 is a dual-band access point configured to simultaneously support wireless signals at a first frequency band (e.g., 2.4 GHz) and at a second frequency band (e.g., 5 GHz). However, access point 130 is also capable of supporting two bands of the same frequency (e.g., 5 GHz). Thus, in this example, the underutilized network capability of access point 130 is support of a second 5 GHz frequency band (i.e., two 5 GHz frequency bands).

At step S210, network optimization program 101 determines an impact on a quality of service of a network based on configuring the network to support the underutilized network capability. In embodiments of the invention, network optimization program 101 determines an impact on the quality of service of a network for a subset of devices whose configuration settings are set below the underutilized network capability. For example, there are one-hundred wireless devices located within a coverage area of a WLAN. Eighty devices are configured to support IEEE 802.11ac standard network protocols and twenty devices are configured to support IEEE 802.11a standard network protocols. If access point(s) 130 of the WLAN are currently configured to support 802.11a standard network protocols and the underutilized network capability of access point(s) 130 is support of IEEE 802.11ac standard network protocols, then the subset of devices would include those twenty devices configured to support IEEE 802.11a standard network protocols.

In some embodiments, an impact on the quality of service of a network is determined for a subset of devices currently located within a coverage area of (but not necessarily connected to) the network. In these embodiments, network optimization program 101 dynamically determines an impact on the quality of service based on configuring the network to support the underutilized network capability each time a wireless device enters or leaves a coverage area of the network. In some embodiments, an impact on the quality of service of a network is determined for a subset of devices currently connected to the network. In these embodiments, network optimization program 101 dynamically determines an impact on the quality of service based on configuring the network to support the underutilized network capability each time a wireless device connects to and/or disconnects from the network.

In some embodiments, an impact on the quality of service based on configuring the network to support the underutilized network capability is determined for a subset of devices located within a coverage area of (but not necessarily connected to) the network over a predetermined period of time. In these embodiments, network optimization program 101 determines an overall impact on the quality of service of the network based on a subset of devices located within a coverage area of the network (at one point or another) throughout the predetermined period of time (e.g., over the course of one hour, one week or one month). In some embodiments, an impact on the quality of service of a network based on configuring the network to support the underutilized network capability is determined for a subset of devices connected to the network throughout the predetermined period of time. In these embodiments, network optimization program 101 determines an overall impact on the quality of service of the network based on a subset of devices connected to the network (at one point or another) throughout the predetermined period of time (e.g., over the course of one hour, one week or one month).

In various embodiments of the invention, network optimization program 101 determines an adverse (i.e., negative) impact on the quality of service of the network for the subset of devices based on configuring the network to support the underutilized network capability. In other words, a determination is made as to whether the quality of service of the network for each device in the subset of devices is decreased. Examples of an adverse impact on the quality of service of a network resulting from configuring a network to support an underutilized network capability include, but are not limited to: (i) a loss of signal strength, (ii) inability to connect to the network, (iii) an increase in time-outs, connection drops and/or unstable connections, (iv) increase in signal interference and (v) decrease in network speed.

In some embodiments, network optimization program 101 determines that the quality of service of the network is adversely impacted if the device is incapable of supporting the underutilized network capability based on a change in the device's configuration settings. In these embodiments, network optimization program 101 compares the configuration settings of a device to the capabilities of the device to determine whether the device is capable of supporting the underutilized network capability.

In other embodiments, network optimization program 101 determines a device is capable of reconfiguring the device's settings to support the underutilized network capability, but the quality of service of the network is nonetheless adversely impacted as a result of reconfiguring the device's settings to support the underutilized network capability. For example, reconfiguring a printer's configuration settings from supporting a 2.4 GHz wireless network to support a 5 GHz wireless network may adversely impact the Wi-Fi signal strength received by the printer based on a location of the printer. One of ordinary skill in the art will appreciate that lower frequency Wi-Fi bands are better at penetrating obstacles such as walls, doors, furniture, etc. In another example, reconfiguring a printer's configuration settings from supporting a 2.4 GHz wireless network to support a 5 GHz wireless network may adversely impact the Wi-Fi signal strength received by the printer based on a distance of the printer from an access point. One of ordinary skill in the art will appreciate that lower frequency Wi-Fi bands provide coverage at longer ranges than higher frequency Wi-Fi bands.

At step S212, network optimization program 101 automatically configures one or more access point(s) 130 based, at least in part, on the underutilized network capability. In some embodiments, network optimization program 101 configures a single access point 130 of a network. In other embodiments, network optimization program 101 configures two or more access points 130 of a logical group of access points of a network.

In various embodiments of the invention, automatically configuring access point(s) 130 is further based on the impact that supporting the underutilized network capability has on the quality of service of the network. In some embodiments, network optimization program 101 configures access point(s) 130 to support the underutilized network capability if a beneficial (i.e., positive) impact on the quality of service of a network for a ratio of client devices 110 (e.g., ninety-five percent) is above a predetermined threshold (e.g., ninety percent of the device population within a coverage area of the network). In other embodiments, network optimization program 101 configures access point(s) 130 to support the underutilized network capability if an adverse (i.e., negative) impact on the quality of service of the network for a ratio of client devices 110 (e.g., five percent) is below a predetermined threshold (e.g., ten percent of the device population within a coverage area of the network). It should be appreciated, however, that embodiments of the invention can be practiced with any predetermined thresholds, any number of predetermined thresholds, and any number of combinations thereof.

In an embodiment, the ratio of client devices 110 is based on a ratio of devices currently located within (but not necessarily connected to) a coverage area of the network. In an embodiment, the ratio of client devices 110 is based on a ratio of devices currently connected to the network. In an embodiment, the ratio of client devices 110 is based on a ratio of devices located within a coverage area of the network (at one point or another) over a predetermined period of time. In an embodiment, the ratio of client devices 110 is based on a ratio of devices connected to the network (at one point or another) over a predetermined period of time.

In some embodiments, automatically configuring access point(s) 130 based on the underutilized network capability includes changing a configuration setting of one or more access points 130. For example, a WLAN includes ten access points, wherein three access points are configured to support 2.4 GHz frequency bands and seven access points are configured to support 5 GHz frequency bands. However, the three access points that are configured to support 2.4 GHz frequency bands are also capable of supporting 5 GHz frequency bands based on a change in the configuration setting of these access points. Thus, network optimization program 101 determines an underutilized network capability of the three access points—namely, the capability of these access points to support 5 GHz frequency bands.

In this example, network optimization program 101 further determines that ninety devices within a coverage area of the WLAN are configured to support wireless communications via 5 GHz frequency bands and ten devices within the coverage area of the WLAN are only configured to support wireless communications via 2.4 GHz frequency bands. However, based on comparing the capabilities of these ten devices to their current configurations, it is determined that eight out of the ten devices are capable of supporting wireless communications via 5 GHz frequency bands based on a change in a device's configuration settings. Thus, the quality of service of the WLAN network would adversely be impacted for two percent of the devices within the coverage area of the WLAN if the three access points were configured to support only 5 GHz frequency bands. If the adverse impact on the quality of service of the network for a ratio of devices (two percent) is below the predetermined threshold (e.g., five percent of the device population), then network optimization program 101 changes the configuration settings of the three access points from only supporting 2.4 GHz frequency bands to only supporting only 5 GHz frequency bands.

In some embodiments, automatically configuring access point(s) 130 based on the underutilized network capability includes disabling a configuration setting of one or more access points 130. For example, a WLAN includes ten access points configured to support IEEE 802.11a, IEEE 802.11n and IEEE 802.11ac standard network protocols. In this example, network optimization program 101 determines that ninety devices within a coverage area of the WLAN are configured to support IEEE 802.11ac standard network protocols and ten devices within a coverage area of the WLAN are configured to support IEEE 802.11a standard network protocols. However, based on comparing the capabilities of these ten devices to their current configurations, it is determined that three out of the ten devices are capable of supporting IEEE 802.11ac standard network protocols and another three out of the ten devices are capable of supporting IEEE 802.11n standard network protocols based on a change in a device's configuration settings. Thus, the quality of service of the WLAN network would adversely be impacted for four percent of the devices within the coverage area of the WLAN if the configuration setting for supporting IEEE 802.11a standard network protocols was disabled. If the adverse impact on the quality of service of the network for a ratio of devices (four percent) is below the predetermined threshold (e.g., 5 percent of the device population), then network optimization program 101 disables the configuration settings of all ten access points to eliminate support of IEEE 802.11a standard network protocols.

In some embodiments, automatically configuring access point(s) 130 based on the underutilized network capability includes shifting an amount of computing resources from a configured setting of an access point to a second configured setting of an access point that is underutilized. For example, a tri-band access point of a WLAN is configured to support two 2.4 GHz frequency bands and one 5 GHz frequency band. However, the access point is also capable of being configured to support: (i) one 2.4 GHz frequency band and two 5 GHz frequency bands or (ii) three 5 GHz frequency bands. Thus, network optimization program 101 determines an underutilized network capability of the access point— namely, the capability of these access points to support either two or three 5 GHz frequency bands.

In this example, network optimization program 101 determines that eighty devices within a coverage area of the WLAN are configured to support wireless communications via 5 GHz frequency bands and twenty devices within a coverage area of the WLAN are configured to support wireless communications via 2.4 GHz frequency bands. However, based on comparing the capabilities of these twenty devices to their current configurations, it is determined that ten out of the twenty devices are capable of supporting wireless communications via 5 GHz frequency bands based on a change in a device's configuration settings. Thus, the quality of service of the WLAN would adversely be impacted for ten percent of the devices within the coverage area of the WLAN if the computing resources of the access point were shifted to support either: (i) two 5 GHz frequency bands and one 2.4 GHz frequency band or (iii) three 5 GHz frequency bands. If the adverse impact on the quality of service of the network for a ratio of devices (10 percent) is below a first predetermined threshold (e.g., 20 percent of the device population), then network optimization program 101 shifts the computing resources of the access point to support two 5 GHz frequency bands and one 2.4 GHz frequency band.

In some embodiments, an amount of computing resources shifted from a first configured setting to a second configured setting of an access point that is underutilized is relational to the ratio of client devices 110 adversely impacted. In the previous example, a shift in computing resources to support two 5 GHz frequency bands and only one 5 GHz frequency band had an adverse impact on the quality of service of the network for ten percent of the devices of the WLAN. However, if the adverse impact on the quality of service of the network for a ratio of devices was instead two percent, then the shift in computing resources of an access point is altered. For example, if the adverse impact on the quality of service of the network for two percent of devices is below a second predetermined threshold (e.g., five percent of the device population), then network optimization program 101 shifts the computing resources of the access point to support three 5 GHz frequency bands and zero 2.4 GHz frequency bands.

In some embodiments, a number of access point(s) 130 whose configuration settings are changed and/or disabled is relational to the ratio of client devices 110 adversely impacted. For example, as the ratio of client devices 110 adversely impacted increases, the number of access point(s) 130 configured to support the underutilized network capability decreases.

For example, ten access points are configured to support a minimum data transfer rate of 24 Mbps. However, each of these ten access points are also capable of being configured to support a minimum data transfer rate of 56 Mbps. Thus, network optimization program 101 determines an underutilized network capability of these access points—namely, the capability of these access points to support higher minimum data transfer rates.

In this example, network optimization program 101 determines that a first group of fifty devices within a coverage area of the WLAN are configured to support a data transfer rate of 56 Mbps and a second group of fifty devices within a coverage area of the WLAN are configured to support a data transfer rate of 24 Mbps. However, based on comparing the capabilities of the devices om the second group to their current configurations, it is determined that thirty of the fifty devices are capable of supporting data transfer rates of 56 Mbps based on a change in a device's configuration settings. Thus, the quality of service of the WLAN would adversely be impacted for twenty percent of the devices within the coverage area of the WLAN if all ten access points were configured to support a minimum data transfer rate of 56 Mbps. Since the adverse impact on the quality of service of the network for a ratio of devices is twenty percent, then network optimization program 101 configures eighty percent of the access points (eight of the ten access points) to support a minimum data transfer rate of 56 Mbps and the remaining twenty percent of the access points (two access points) remain configured to support a minimum basic data transfer rate of 24 Mbps.

Similarly, as the ratio of client devices 110 adversely impacted decreases, the number of access point(s) 130 configured to support the underutilized network capability increases. In the previous example, configuring the ten access points to support a minimum data transfer rate of 56 Mbps had an adverse impact on the quality of service of the network for twenty percent of the devices of the WLAN. However, if the adverse impact on the quality of service of the network for a ratio of devices was instead ten percent, then the number of access points configured to support a minimum data transfer rate access point is altered. Since the adverse impact on the quality of service of the network for a ratio of devices is now ten percent, then network optimization program 101 configures ninety percent of the access points (nine of the ten access points) to support a minimum data transfer rate of 56 Mbps and the remaining ten percent of the access points (one access point) remains configured to support a minimum data transfer rate of 24 Mbps.

In embodiments of the invention, changing a configuration setting of an access point, disabling a configuration setting of an access point and/or shifting computing resources of an access point from a configured setting to a underutilized network capability can include, but is not limited to: (i) minimum supported basic data rates, (ii) supported IEEE. 802.11 standard network protocols, (iii) supported Wi-Fi frequency bands, (iv) supported channel widths and (v) supported radio transmit power (i.e. wireless range). However, one of ordinary skill in the art will appreciate that any number and/or type of configuration settings of an access point can be changed or disabled to optimize performance of a network. Similarly, one of ordinary skill in the art will appreciate that the computing resources of an access point may be shifted or reallocated in any number of different ways to optimize performance of a network.

In various embodiments of the invention, network optimization program 101 determines which particular access points 130 should be configured based on the underutilized network capability. In these embodiments, network optimization program 101 selects access points for configuration that will best mitigate the adverse impact on the quality of service of the network for those devices that are not capable of supporting the underutilized network capability.

In some embodiments, a selection of an access point for configuration is based on analyzing historical data to discover device trends within a coverage area of a network. For example, there are three wireless access points (A, B and C) of a network configured to support 2.4 GHz frequency bands. If a majority of devices adversely impacted by configuring an access point based on the underutilized capability (e.g., 5 GHz frequency bands) are generally located within a wireless range of access point A, then network optimization program 101 configures access point B and access point C to support the underutilized network capability.

In other embodiments, a selection of an access point for configuration is based on a location of access points 130. For example, there are two wireless access points (D and E) of a network configured to support 2.4 GHz frequency bands. However, due to the existence of more obstacles near access point D than access point E that can impede the signal strength and range of wireless signals, network optimization program 101 changes the configuration settings of access point E to support a 5 GHz frequency band.

Figure 3:
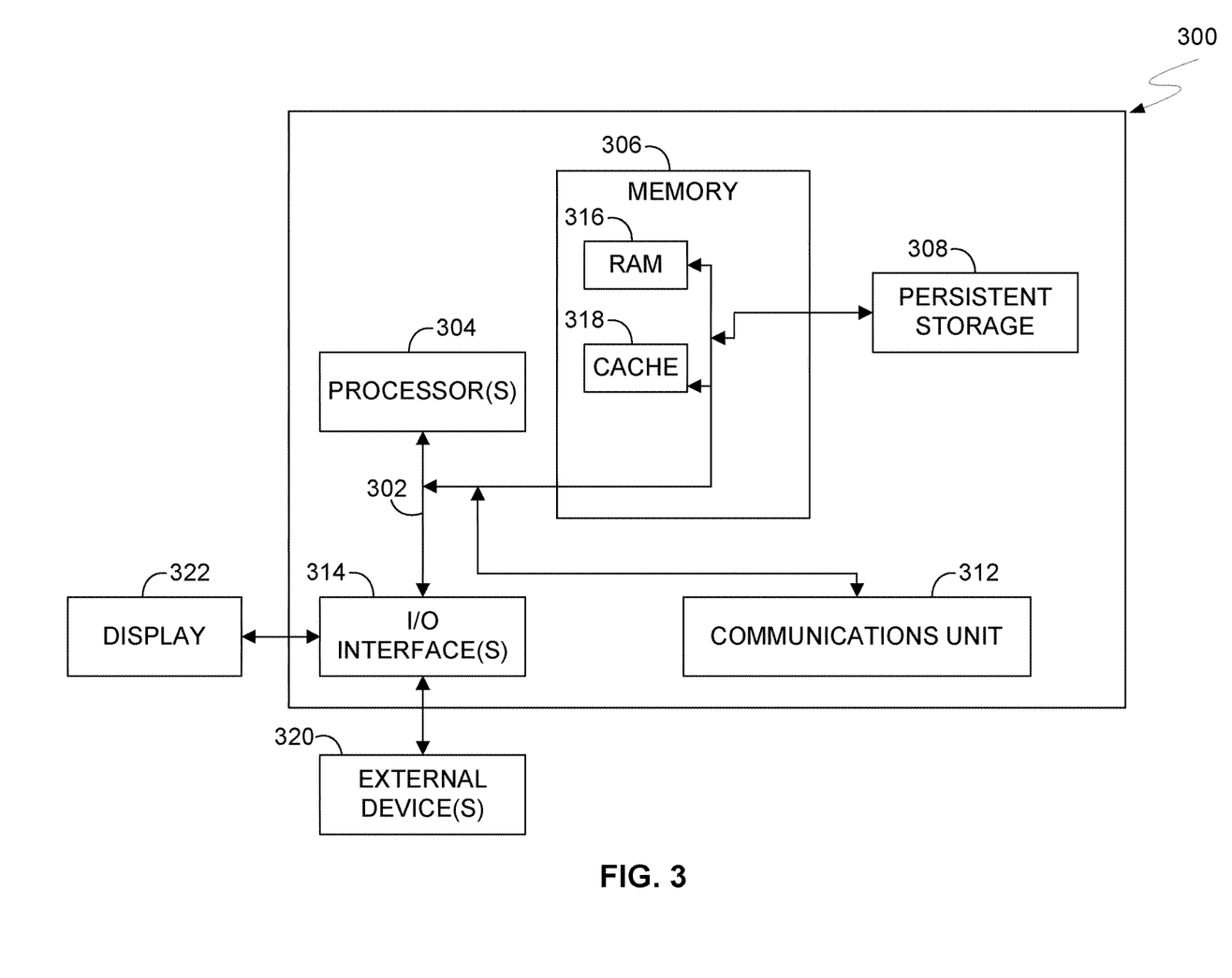
FIG. 3 is a block diagram depicting components of a computing device, generally designated 300, suitable for executing a network optimization program in accordance with at least one embodiment of the invention.

FIG. 3 is a block diagram depicting components of a computing device 300 suitable for executing network optimization program 101 in accordance with at least one embodiment of the invention. In an embodiment, computing device 300 is representative of computer system 120. Computing device 300 includes one or more processor(s) 304 (including one or more computer processors), communications fabric 302, memory 306 including, RAM 316, and cache 318, persistent storage 308, communications unit 312, I/O interfaces 314, display 322, and external devices 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between the computer processor(s) 304, memory 306, persistent storage 308, communications unit 312, and input/output (I/O) interface(s) 314. Communications fabric 302 can be implemented with any architecture suitable for passing data or control information between processors 304 (e.g., microprocessors, communications processors, and network processors), memory 306, external devices 320, and any other hardware components within a system. For example, communications fabric 302 can be implemented with one or more buses.

Memory 306 and persistent storage 308 are computer readable storage media. In the depicted embodiment, memory 306 includes random access memory (RAM) 316 and cache 318. In general, memory 306 can include any suitable volatile or non-volatile one or more computer readable storage media.

Program instructions for network optimization program 101 can be stored in persistent storage 308, or more generally, any computer readable storage media, for execution by one or more of the respective computer processors 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of the persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300, such that the input data may be received and the output similarly transmitted via communications unit 312.

I/O interface(s) 314 allows for input and output of data with other devices that may operate in conjunction with computing device 300. For example, I/O interface 314 may provide a connection to external devices 320, which may be as a keyboard, keypad, a touch screen, or other suitable input devices. External devices 320 can also include portable computer-readable storage media, for example thumb drives, portable optical or magnetic disks, and memory cards. Software and data used to practice embodiments of the present invention can be stored on such portable computer readable storage media and can be loaded onto persistent storage 308 via I/O interface(s) 314. I/O interface(s) 314 also can similarly connect to display 322. Display 322 provides a mechanism to display data to a user and may be, for example, a computer monitor or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A computer-implemented method comprising:
    determining, by one or more processors, (i) a set of configuration settings of a plurality of devices, and (ii) a set of capabilities of the plurality of devices, wherein the plurality of devices are located within a coverage area of a wireless network;
    determining, by the one or more processors, a set of capabilities of a plurality of wireless access points of the wireless network;
    determining, by the one or more processors, an underutilized network capability of the wireless network based, at least in part, on the set of configuration settings of the plurality of devices, the set of capabilities of the plurality of devices, and the set of capabilities of the plurality of wireless access points; and
    configuring, by the one or more processors, one or more wireless access points of the plurality of wireless access points to support the underutilized network capability, wherein a number of wireless access points configured to support the underutilized network capability increases as a ratio of devices adversely impacted by configuring the one or first wireless access points to support the underutilized network capability decreases.

2. The computer-implemented method of claim 1, further including:
    determining, by the one or more processors, an adverse impact on a quality of service of the wireless network based on configuring the one or more wireless access points to support the underutilized network capability.

3. The computer-implemented method of claim 2, wherein the adverse impact on the quality of service of the wireless network is determined for respective devices of the plurality of devices having a configuration setting below the underutilized network capability.

4. The computer-implemented method of claim 3, wherein determining, by the one or more processors, the adverse impact on the quality of service of the wireless network for the respective devices of the plurality of devices having the configuration setting below the underutilized network capability further includes:
    comparing, by the one or more processors, a set of configuration settings to a set of capabilities for each device; and
    determining, by the one or more processors, based on the comparison, that a device cannot be configured to support the underutilized network capability.

5. The computer-implemented method of claim 1, wherein configuring the one or more wireless access points of the plurality of access points is further based on:
    determining, by the one or more processors, a ratio of devices of the plurality of devices that are adversely impacted by configuring the one or more wireless access points of the plurality of wireless access points to support the underutilized network capability; and
    configuring, by the one or more processors, all of the one or more wireless access points to support the underutilized network capability based on the ratio of devices being below a predetermined threshold.

6. The computer-implemented method of claim 1, wherein configuring the one or more wireless access points based, at least in part, on the underutilized network capability includes one or more actions from the group consisting of: (i) changing a configuration setting of a wireless access point, (ii) disabling a configuration setting of a wireless access point and (iii) shifting computing resources of a wireless access point between a first configuration setting and a second configuration setting.

7. A computer program product, the computer program product comprising one or more computer readable storage media and program instructions stored on the one or more computer readable storage media, the program instructions comprising instructions to:
    determine (i) a set of configuration settings of a plurality of devices and (ii) a set of capabilities of the plurality of devices, wherein the plurality of devices are located within a coverage area of a wireless network;
    determine a set of capabilities of a plurality of wireless access points of the wireless network;
    determine an underutilized network capability of the wireless network based, at least in part, on the set of configuration settings of the plurality of devices, the set of capabilities of the plurality of devices, and the set of capabilities of the plurality of wireless access points; and
    configure one or more wireless access points of the plurality of wireless access points to support the underutilized network capability, wherein a number of wireless access points configured to support the underutilized network capability increases as a ratio of devices adversely impacted by configuring the one or first wireless access points to support the underutilized network capability decreases.

8. The computer program product of claim 7, further including instructions to:
    determine an adverse impact on a quality of service of the wireless network based on configuring the one or more wireless access points to support the underutilized network capability.

9. The computer program product of claim 8, wherein the adverse impact on the quality of service of the wireless network is determined respective devices of the plurality of devices having a configuration setting below the underutilized network capability.

10. The computer program product of claim 9, wherein the instructions to determine the adverse impact on the quality of service of the wireless network for the respective devices of the plurality of devices having the configuration setting below the underutilized network capability further includes instructions to:
    compare a set of configuration settings to a set of capabilities for each device; and
    determine, based on the comparison, that a device cannot be configured to support the underutilized network capability.

11. The computer program product of claim 7, wherein the instructions to configure the one or more wireless access points of the plurality of access points is further based on instructions to:
    determine a ratio of devices of the plurality of devices that are adversely impacted by configuring the one or more wireless access points of the plurality of wireless access points to support the underutilized network capability; and
    configure all of the one or more wireless access points to support the underutilized network capability based on the ratio of devices being below a predetermined threshold.

12. The computer program product of claim 7, wherein the instructions to configure the one or more wireless access points based, at least in part, on the underutilized network capability includes one or more actions from the group consisting of: (i) changing a configuration setting of a wireless access point, (ii) disabling a configuration setting of a wireless access point and (iii) shifting computing resources of a wireless access point between a first configuration setting and a second configuration setting.

13. A computer system comprising:
   one or more computer processors;
   one or more computer readable storage media;
   computer program instructions;
   the computer program instructions being stored on the one or more computer readable storage media for execution by the one or more computer processors; and
   the computer program instructions comprising instructions to:
   determine (i) a set of configuration settings of a plurality of devices and (ii) a set of capabilities of the plurality of devices, wherein the plurality of devices are located within a coverage area of a wireless network;
   determine a set of capabilities of a plurality of wireless access points of the wireless network;
   determine an underutilized network capability of the wireless network based, at least in part, on the set of configuration settings of the plurality of devices, the set of capabilities of the plurality of devices, and the set of capabilities of the plurality of wireless access points; and
   configure one or more wireless access points of the plurality of wireless access points to support the underutilized network capability, wherein a number of wireless access points configured to support the underutilized network capability increases as a ratio of devices adversely impacted by configuring the one or first wireless access points to support the underutilized network capability decreases.

14. The computer system of claim 13, further including instructions to:
   determine an adverse impact on a quality of service of the wireless network based on configuring the one or more wireless access points to support the underutilized network capability.

15. The computer system of claim 14, wherein the adverse impact on the quality of service of the wireless network is determined for respective devices of the plurality of devices having a configuration setting below the underutilized network capability.

16. The computer system of claim 15, wherein the instructions to determine the adverse impact on the quality of service of the wireless network for the respective devices of the plurality of devices having the configuration setting below the underutilized network capability further includes instructions to:
   compare a set of configuration settings to a set of capabilities for each device; and
   determine, based on the comparison, that a device cannot be configured to support the underutilized network capability.

17. The computer system of claim 13, wherein the instructions to configure the one or more wireless access points of the plurality of access points is further based on instructions to:
   determine a ratio of devices of the plurality of devices that are adversely impacted by configuring the one or more wireless access points of the plurality of wireless access points to support the underutilized network capability; and
   configure all of the one or more wireless access points to support the underutilized network capability based on the ratio of devices being below a predetermined threshold.

* * * * *